US011847863B2

(12) United States Patent
Thorpe

(10) Patent No.: US 11,847,863 B2
(45) Date of Patent: Dec. 19, 2023

(54) LICENSING AND TICKETING SYSTEM FOR TRAFFIC VIOLATION

(71) Applicant: Charlena L. Thorpe, Suwanee, GA (US)

(72) Inventor: Charlena L. Thorpe, Suwanee, GA (US)

( * ) Notice: Subject to any disclaimer, the term of this patent is extended or adjusted under 35 U.S.C. 154(b) by 0 days.

(21) Appl. No.: 17/887,452

(22) Filed: Aug. 13, 2022

(65) Prior Publication Data

US 2022/0392269 A1 Dec. 8, 2022

Related U.S. Application Data

(63) Continuation of application No. 16/936,405, filed on Jul. 22, 2020, now Pat. No. 11,423,703.

(51) Int. Cl.
| | | |
|---|---|---|
| *G06F 15/16* | (2006.01) | |
| *G07B 5/04* | (2006.01) | |
| *H04L 67/104* | (2022.01) | |
| *G06Q 10/10* | (2023.01) | |
| *H04W 4/00* | (2018.01) | |
| *H04W 4/30* | (2018.01) | |
| *G06Q 30/018* | (2023.01) | |
| *G06Q 50/26* | (2012.01) | |
| *G06F 16/951* | (2019.01) | |

(52) U.S. Cl.
CPC .............. *G07B 5/04* (2013.01); *G06Q 10/10* (2013.01); *H04L 67/104* (2013.01); *H04W 4/00* (2013.01); *H04W 4/30* (2018.02); *G06F 16/951* (2019.01); *G06Q 30/018* (2013.01); *G06Q 50/26* (2013.01)

(58) Field of Classification Search
None
See application file for complete search history.

(56) References Cited

U.S. PATENT DOCUMENTS

| | | | | |
|---|---|---|---|---|
| 2008/0238719 A1* | 10/2008 | Marchasin | ............ | G08G 1/017 340/901 |
| 2012/0194357 A1* | 8/2012 | Ciolli | ..................... | G08G 1/052 340/936 |
| 2018/0018869 A1* | 1/2018 | Ahmad | .................. | G06V 20/63 |

* cited by examiner

*Primary Examiner* — Wing F Chan
*Assistant Examiner* — Andrew Woo
(74) *Attorney, Agent, or Firm* — Charlena Thorpe, Esq.; Incorporating Innovation LLC

(57) ABSTRACT

Implementations of a licensing and ticketing system is provided. In some implementations, a computer-implemented method comprises receiving a request for licensing information at a first computing device. In some implementations, the computer-implemented method further comprises retrieving at the first computing device licensing information from storage on the first computing device wherein the retrieved licensing information includes a unique license number issued by a governmental entity, a name, and a pre-stored photograph. In some implementations, the computer-implemented method further comprises capturing a current photograph at the first computing device after receiving the request for licensing information. In some implementations, the computer-implemented method further comprises transmitting at the first computing device the retrieved licensing information including the pre-stored photograph and the current photograph over a network to the second computing device. In some implementations, the computer-implemented method further comprises receiving ticketing information at the first computing device wherein the ticketing information includes a law citation.

5 Claims, 2 Drawing Sheets

LICENSING AND TICKETING SYSTEM FOR TRAFFIC VIOLATION

CROSS REFERENCE TO RELATED APPLICATION

This continuation application claims the benefit of U.S. patent application Ser. No. 16/936,405, which was filed on Jul. 22, 2020 claiming the benefit of U.S. patent application Ser. No. 15/652,216, which was filed on Jul. 17, 2017 claiming the benefit of U.S. Patent Application Ser. No. 62/363,026, which was filed on Jul. 15, 2016, each of which is incorporated herein by reference in its entirety.

TECHNICAL FIELD

This disclosure relates to implementations of licensing and ticketing system for traffic violation.

BACKGROUND

Confrontations including violence and even death to a police officer or vehicle occupant can arise from a traffic stop. During a traffic stop, the police officer must exit his/her police vehicle and make interact with an occupant of a vehicle. Tension may be high and the interaction may escalate to a confrontation.

DETAILED DESCRIPTION

Figure 1:
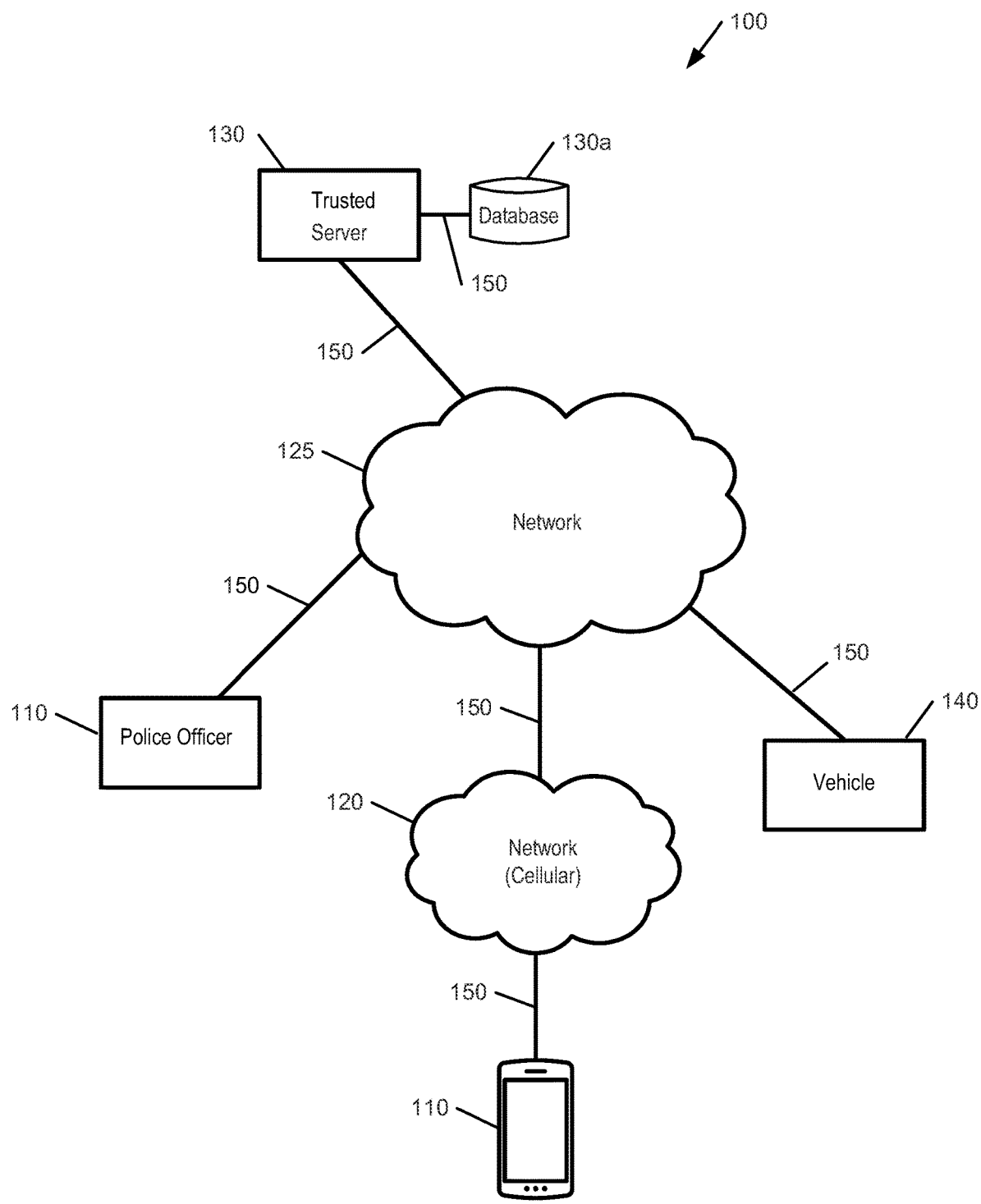
FIG. 1 illustrates an implementation of an example environment of a licensing and ticketing system according to the present disclosure.

Implementations of a licensing and ticketing system for traffic violation are provided.

In some implementations, the licensing and ticketing system helps to reduce the interactions between police officers (or any other agents of a government or agency) and vehicle occupants by facilitating the exchange of licensing information and traffic ticket information without the need of a police officer exiting his/her vehicle.

In some implementations, the system comprises an application operative on a portable computing device (including a vehicle) to allow an occupant of a vehicle to provide licensing information or other information (e.g., vehicle registration information or proof of insurance) without the need for a police office to exit his/her vehicle to retrieve the information. In some implementations, the system further comprises an application operative on a portable computing device (including a vehicle) to allow a police officers to request licensing information and issue tickets without exiting his/her car or otherwise coming into close contact with an occupant of a vehicle.

In some implementations, a computer-implemented method for issuing ticketing and licensing information is provided. In some implementations, the computer-implemented method comprises receiving a request for licensing information at a first computing device wherein the request is transmitted over a network from a second computing device. In some implementations, the computer-implemented method further comprises retrieving at the first computing device licensing information from storage on the first computing device wherein the retrieved licensing information includes a unique license number issued by a governmental entity, a name, and a pre-stored photograph. In some implementations, the computer-implemented method further comprises capturing a current photograph at the first computing device after receiving the request for licensing information. In some implementations, the computer-implemented method further comprises transmitting at the first computing device the retrieved licensing information including the pre-stored photograph and the current photograph over a network to the second computing device. In some implementations, the computer-implemented method further comprises receiving ticketing information at the first computing device wherein the ticketing information includes a law citation and wherein the ticketing information is transmitted over a network from the second computing device.

In some implementations, when a police officer stops a vehicle for a traffic violation or other offense, the police officer can wirelessly send a request for licensing information using a portable computing device ("requesting device") to one or more portable computing devices in the vehicle. In some implementations, before communicating with a device in the vehicle, a secure connection may be established.

In some implementations of the present disclosure, a portable computing device having a licensing and ticketing system operative thereon may search for and connect with other portable computing devices having the licensing and ticketing system operative thereon. In some implementations of the present disclosure, a portable computing device having a licensing and ticketing system operative thereon may automatically search for and automatically connect with other portable computing devices having the licensing and ticketing system operative thereon. In some implementations of the present disclosure, a portable computing device having a licensing and ticketing system operative thereon may search for and/or connect with other portable computing devices having the licensing and ticketing system operative thereon based on user input. One of ordinary skill in the art with the benefit of this invention would know how to connect portable computing devices within a predetermined range to enable the transmission of information between the portable computing devices.

In some implementations, the licensing information may include a unique license number, name, birthdate, address, height, weight, sex, eye color, expiration date, signature, or any combination of the foregoing or any other information. In some implementations, the licensing information is information associated with a driver's license issued by a governmental entity. In some implementations, the information includes a prior photograph of the person associated with the licensing information (e.g., a photograph taken by a governmental entity for a government issued license).

In some implementations, when the request is received by a portable computing device in the vehicle ("receiving device"), the driver may cause the receiving device to send licensing information or other requested information wirelessly to the requesting device. In some implementations, once a connection is established between the requesting device and the receiving device, the requested information may be transmitted to the requesting device automatically (e.g., without permission from a user).

In some implementations, the requested information may be pre-stored on the receiving device by downloading the information from a verified or trusted server. In some implementations, the verified or trusted server may be a server having verified or trusted licensing information from a governmental entity.

In some implementations, the requested information may be pre-stored on the receiving device by a user. In some implementations, the licensing information may be pre-stored on the receiving device by a user by taking a photograph of a driver's license and storing it on the receiving device.

In some implementations, after the request for licensing information is received, the driver may take a picture of his/her face using the receiving device and transmit the picture to the requesting device. In this way, the police office can compare prior photograph transmitted with the licensing information and the current photograph to determine if the driver of the vehicle is associated with the licensing information.

After the police officer verifies the identify of the driver as the individual pictured on the prior photograph transmitted with the licensing information, the police officer may transmit ticketing information to the driver's device. The ticketing information may be any official notice. In some implementations, the ticketing information may include a telephone number, a date, a court, an address, a code citation, or any other information. In some implementations, the ticketing information may include some of the licensing information received. In some implementation, the ticketing information may include the name received. In some implementation, the ticketing information may include unique license number. Thereafter, the driver can view the ticketing information on his/her device.

In some implementations, a video link can be established between a requesting device and the receiving device. The video link can be used to display a driver on the requesting device so that the police officer may verify his/her identity.

In this way, interactions and confrontations between police officers and vehicle occupants can be reduced.

FIG. 1 illustrates an implementation of an example environment 100 of a licensing and ticketing system according to the present disclosure.

As shown in FIG. 1, in some implementations, the environment 100 may include one or more law enforcement client devices 110, a wireless cellular network 120, a network 125, one or more trusted servers 130, and one or more vehicle client devices 140. In some implementations, the example licensing and ticketing system environment 100 also may include one or more data storage 130a1 linked to one or more servers 130.

In some implementations, a client device 110 may be used by users (e.g., law enforcement officers) to request licensing information and issue tickets or to access other functions of the licensing and ticketing system of the present disclosure discussed above.

In some implementations, a client device 140 may be used by occupants of a vehicles to provide licensing information or other information as discussed above.

The client devices 110, 140 may be any type of computing device, such as a desktop computer system, a laptop, cellular phone, a smart device, a mobile telephone, a tablet-style computer, or any other device capable of wireless or wired communication.

In some implementations, the client devices 110, 140 includes hardware, software, or embedded logic components or a combination of two or more such components and is configured to carry out the appropriate functions implemented or supported by the client devices 110, 140.

In some implementations, the client devices 110, 140 may include one or more processors, one or more memories, one or more displays, one or more interfaces, one or more components capable of inputting data, one or more components capable of outputting data, one or more components capable of communicating with any other component of the environment 100 of the licensing and ticketing system, or any other component suitable for a particular purpose.

In some implementations, the client devices 110, 140 are configured to access networks 120 and/or 125. In some implementations, the client devices 110, 140 are configured to communicate with server 130.

In some implementations, the client device 110, 140 can connect to the network 125 through a wireless cellular network 120, such as GPRS-based and CDMA-based wireless networks, as well as 802.16 WiMax and long-range wireless data networks.

In some implementations, components of the licensing and ticketing system environment 100 may communicate with any other component of the environment 100 over network 125. Network 125 may be any suitable network. In some implementations, for example, one or more portions of network 125 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another network 125, or a combination of two or more of the foregoing.

In some embodiments, components of the licensing and ticketing system environment 100 may be configured to communicate over links 150. Links 150 may connect components of the environment 100 to networks 120, 125 or to each other. In some implementations, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links 150. Links 150 may not be the same throughout the environment 100.

In some implementations, the server device 130 may include a processor, memory, user accounts, and one or more modules to perform various functions.

In some implementations, each server 130 may be a unitary server or may be a distributed server spanning multiple computers or multiple datacenters. Servers 130 may be of various types, such as, for example and without limitation, web server, file server, application server, exchange server, database server, or proxy server. In some implementations, each server 130 may include hardware, software, or embedded logic components or a combination of two or more such components for carrying out the appropriate functionalities implemented or supported by server 130. For example, a web server is generally capable of hosting websites containing web pages or particular elements of web pages. More specifically, a web server may host HTML files or other file types, or may dynamically create or constitute files upon a request, and communicate them to clients 110, 140 in response to HTTP or other requests from clients 110, 140. A database server is generally capable of providing an interface for managing data stored in one or more data stores.

In some implementations, one or more data storages 130a1 may be communicatively linked to one or more servers 130 via one or more links 150. In some implementations, data storages 130a1 may be used to store various types of information such as licensing information, vehicle registration information (e.g., unique vehicle number, vehicle make and model) and insurance information (e.g., insurer, insured, policy number, etc.). In some implementations, the information stored in data storages 130a1 may be organized according to specific data structures. In particular embodiment, each data storage 130a1 may be a relational database. Particular embodiments may provide interfaces that enable servers 130 or clients 110, 140 to manage, e.g., retrieve, modify, add, or delete, the information stored in data storage 130a1.

Figure 2:
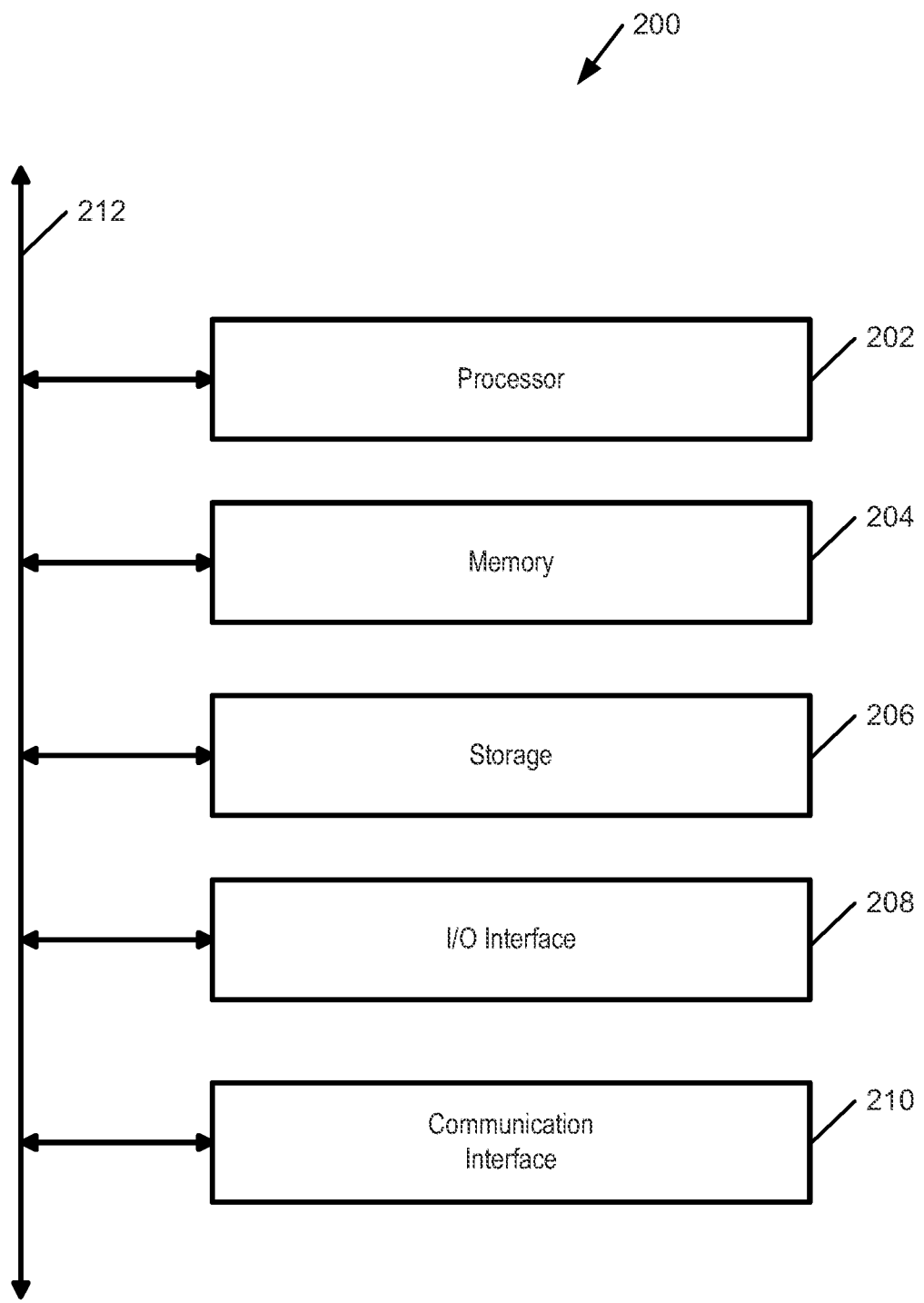
FIG. 2 illustrates an example computer system, which may be used with implementations of the present disclosure.

FIG. 2 illustrates an example computer system 200, which may be used with some implementations of the present invention. This disclosure contemplates any suitable number of computer systems 200.

This disclosure contemplates computer system 200 taking any suitable physical form. In some implementations, as an example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop, an interactive kiosk, a mainframe, a mesh of computer systems, a mobile telephone, a personal digital assistant (PDA), a server, or a combination of two or more of these.

In some implementations, where appropriate, computer system 200 may include one or more computer systems 200; be unitary or distributed; span multiple locations; span multiple machines; or reside in a cloud, which may include one or more cloud components in one or more networks.

In some implementations, where appropriate, one or more computer systems 200 may perform without substantial spatial or temporal limitation one or more steps of one or more methods described or illustrated herein. In some implementations, as an example and not by way of limitation, one or more computer systems 200 may perform in real time or in batch mode one or more steps of one or more methods described or illustrated herein. In some implementations, one or more computer systems 200 may perform at different times or at different locations one or more steps of one or more methods described or illustrated herein, where appropriate.

In some implementations, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In some implementations, processor 202 includes hardware for executing instructions, such as those making up a computer program. In some implementations, as an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206.

In some implementations, processor 202 may include one or more internal caches for data, instructions, or addresses. The present disclosure contemplates processor 202 including any suitable number of any suitable internal caches, where appropriate. In some implementations, as an example and not by way of limitation, processor 202 may include one or more instruction caches, one or more data caches, and one or more translation look-aside buffers (TLBs).

In some implementations, instructions in the instruction caches may be copies of instructions in memory 204 or storage 206, and the instruction caches may speed up retrieval of those instructions by processor 202.

In some implementations, data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data.

In some implementations, the data caches may speed up read or write operations by processor 202. In some implementations, the TLBs may speed up virtual-address translation for processor 202.

In some implementations, processor 202 may include one or more internal registers for data, instructions, or addresses. The present disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In some implementations, memory 204 includes main memory for storing instructions for processor 202 to execute or data for processor 202 to operate on. In some implementations, as an example and not by way of limitation, computer system 200 may load instructions from storage 206 or another source (such as, for example, another computer system 200) to memory 204.

In some implementations, processor 202 may then load the instructions from memory 204 to an internal register or internal cache. In some implementations, to execute the instructions, processor 202 may retrieve the instructions from the internal register or internal cache and decode them.

In some implementations, during or after execution of the instructions, processor 202 may write one or more results (which may be intermediate or final results) to the internal register or internal cache. In some implementations, processor 202 may then write one or more of those results to memory 204.

In some implementations, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere).

In some implementations, one or more memory buses (which may each include an address bus and a data bus) may couple processor 202 to memory 204. In some implementations, bus 212 may include one or more memory buses, as described below.

In some implementations, one or more memory management units (MMUs) reside between processor 202 and memory 204 and facilitate accesses to memory 204 requested by processor 202.

In some implementations, memory 204 includes random access memory (RAM). In some implementations, this RAM may be volatile memory, where appropriate.

In some implementations, where appropriate, this RAM may be dynamic RAM (DRAM) or static RAM (SRAM). Moreover, in some implementations, where appropriate, this RAM may be single-ported or multi-ported RAM. The present disclosure contemplates any suitable RAM.

In some implementations, memory 204 may include one or more memories 204, where appropriate. Although this disclosure describes and illustrates particular memory, this disclosure contemplates any suitable memory.

In some implementations, storage 206 includes mass storage for data or instructions. In some implementations, as an example and not by way of limitation, storage 206 may include an HDD, a floppy disk drive, flash memory, an optical disc, a magneto-optical disc, magnetic tape, or a Universal Serial Bus (USB) drive or a combination of two or more of these.

In some implementations, storage 206 may include removable or non-removable (or fixed) media, where appropriate. In some implementations, storage 206 may be internal or external to computer system 200, where appropriate. In some implementations, storage 206 is non-volatile, solid-state memory.

In some implementations, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form.

In some implementations, storage 206 may include one or more storage control units facilitating communication between processor 202 and storage 206, where appropriate. In some implementations, where appropriate, storage 206 may include one or more storages 206. Although this disclosure describes and illustrates particular storage, this disclosure contemplates any suitable storage.

In some implementations, I/O interface 208 includes hardware, software, or both providing one or more interfaces for communication between computer system 200 and one or more I/O devices. In some implementations, computer system 200 may include one or more of these I/O devices, where appropriate.

In some implementations, one or more of these I/O devices may enable communication between a person and computer system 200. In some implementations, as an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

In some implementations, an I/O device may include one or more sensors. This disclosure contemplates any suitable I/O devices and any suitable I/O interfaces 208 for them.

In some implementations, where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In some implementations, communication interface 210 includes hardware, software, or both providing one or more interfaces for communication (such as, for example, packet-based communication) between computer system 200 and one or more other computer systems 200 or one or more networks.

In some implementations, as an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it.

In some implementations, as an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these.

In some implementations, one or more portions of one or more of these networks may be wired or wireless. In some implementations, as an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In some implementations, computer system 200 may include any suitable communication interface 210 for any of these networks, where appropriate. In some implementations, communication interface 210 may include one or more communication interfaces 210, where appropriate. Although this disclosure describes and illustrates a particular communication interface, this disclosure contemplates any suitable communication interface.

In some implementations, bus 212 includes hardware, software, or both coupling components of computer system 200 to each other. In some implementations, as an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these.

In some implementations, bus 212 may include one or more buses 212, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. In some implementations, as an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate.

Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In some implementations, a computer-readable storage medium implements one or more portions of processor 202 (such as, for example, one or more internal registers or caches), one or more portions of memory 204, one or more portions of storage 206, or a combination of these, where appropriate.

In some implementations, a computer-readable storage medium implements RAM or ROM. In some implementations, a computer-readable storage medium implements volatile or persistent memory.

In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate.

In some implementations, software includes one or more application programming interfaces (APIs). This disclosure contemplates any suitable software written or otherwise expressed in any suitable programming language or combination of programming languages.

In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code).

In some implementations, software is expressed in JAVA. In some implementations, software is expressed in Hyper Text Markup Language (HTML), Extensible Markup Language (XML), or other suitable markup language.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example. it will apparent to one of ordinary skill in the art that the invention may be used with any electronic network service, even if it is not provided through a website.

Any computer-based system that provides networking functionality can be used in accordance with the present invention even if it relies, for example, on e-mail, instant messaging or other forms of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The present disclosure encompasses all changes, substitutions, variations, alterations, and modifications to the example embodiments herein that a person having ordinary skill in the art would comprehend.

The invention claimed is:

1. A computer-implemented method for issuing ticketing and licensing information, the method comprising:

at a first computing device connecting, without permission from a user, to a second computing device within a predetermined range;

receiving a request for licensing information at the first computing device wherein the request is transmitted over a network from the second computing device;

retrieving at the first computing device licensing information from storage on the first computing device wherein the retrieved licensing information includes a unique license number issued by a governmental entity, a name, and a pre-stored photograph;

capturing a video of a face at the first computing device after receiving the request for licensing information wherein the video is captured after receiving the request for licensing information;

transmitting at the first computing device the retrieved licensing information including the pre-stored photograph and the captured video over a network to the second computing device; and receiving ticketing information at the first computing device wherein the ticketing information includes a law citation and wherein the ticketing information is transmitted over a network from the second computing device.

2. The computer-implemented method of claim 1 further comprising receiving a request for vehicle registration information and vehicle insurance information at the first computing device over a network from the second computing device and transmitting, at the first computing device, the vehicle registration information and the vehicle insurance information over a network to the second computing device.

3. A computer-implemented method for issuing ticketing and licensing information, the method comprising:

at a first computing device searching for a second computing device within a predetermined range and connecting, without permission from a user, to the second computing device;

transmitting a request for licensing information from the first computing device wherein the request is transmitted over a network to the second computing device;

receiving, in response to the request, the licensing information at the first computing device wherein the licensing information comprises a unique license number issued by a governmental entity, a name, a pre-stored photograph, and a video and wherein the licensing information and the video are transmitted over a network from the second computing device; and transmitting ticketing information from the first computing device wherein the ticketing information includes a law citation and wherein the ticketing information is transmitted over a network to the second computing device.

4. A ticketing and licensing method comprising, downloading licensing information including a unique license number issued by a governmental entity, a name, and a pre-stored photograph from a server authorized by the governmental entity wherein the pre-stored photograph is a photograph taken by the governmental entity for a government issued license;

storing on a portable handheld mobile phone the licensing information, and transmitting the stored licensing information from the portable handheld mobile phone over a network to a computing device.

5. The ticketing and licensing method of claim 4 further comprising:

driving a first vehicle and after being stopped by a human police person driving a second vehicle, the portable handheld mobile phone connecting, without permission from a user, to a second computing device within a predetermined range and receiving at the portable handheld mobile phone in the first vehicle a request for licensing information from the second computing device in the second vehicle;

capturing a video of a driver in the first vehicle using the portable handheld mobile phone after receipt of the request;

transmitting, using the portable handheld mobile phone, the licensing information including the unique license number, the name, the pre-stored photograph and the video captured to the second computing device in response to the request; and receiving ticketing information at the portable handheld mobile phone, wherein the ticketing information includes a law citation and wherein the ticketing information is transmitted over a network from the second computing device.

* * * * *